United States Patent
Steeves et al.

(10) Patent No.: US 10,033,575 B2
(45) Date of Patent: Jul. 24, 2018

(54) SYSTEM AND METHOD OF TROUBLESHOOTING IN A TELECOMMUNICATIONS NETWORK

(71) Applicant: Level 3 Communications, LLC, Broomfield, CO (US)

(72) Inventors: Daniel B. Steeves, Lakewood, CO (US); Steve R. Wakumoto, Golden, CO (US); Travis D. Ewert, Highlands Ranch, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

(21) Appl. No.: 15/596,584

(22) Filed: May 16, 2017

(65) Prior Publication Data
US 2018/0145874 A1     May 24, 2018

Related U.S. Application Data

(60) Provisional application No. 62/424,983, filed on Nov. 21, 2016.

(51) Int. Cl.
*H04W 24/00*     (2009.01)
*H04L 12/24*     (2006.01)

(52) U.S. Cl.
CPC ...... *H04L 41/0677* (2013.01); *H04L 41/0226* (2013.01); *H04L 41/069* (2013.01); *H04L 41/0645* (2013.01)

(58) Field of Classification Search
CPC ............ H04L 41/0677; H04L 41/0695; H04L 41/0654; H04L 41/0659; H04L 41/0663; H04L 41/0672
USPC ...................................................... 455/423
See application file for complete search history.

(56) References Cited

U.S. PATENT DOCUMENTS

| | | | |
|---|---|---|---|
| 8,886,179 B2 * | 11/2014 | Pathuri | H04L 41/0609 455/423 |
| 2012/0009904 A1 * | 1/2012 | Modi | H04W 4/028 455/413 |

* cited by examiner

*Primary Examiner* — Huy C Ho

(57) ABSTRACT

Aspects of the present disclosure involve systems and methods for troubleshooting interruptions of service from a telecommunications network and providing potential remedies to restore the interrupted service to the customer. The system may utilize a service path mapping system to determine the network elements, components, connections, and/or ports included in providing a particular service to a customer and obtain data from several databases of the telecommunications network related to the service path. Once collected, the data may be correlated utilized to diagnose or identify a source of the service interruption in the service path to begin to restore the interrupted service. In one embodiment, an analysis of the provided information provides an output a probability of potential sources of the service interruption. This information may then be utilized to restore the service to the customer with minimal or no involvement with network engineers or field technicians.

17 Claims, 6 Drawing Sheets

NETWORK DATABASE INFORMATION

- 402 → ORDER SPECIFIC INFORMATION
- 404 → MONITORING SYSTEM ALARMS
- 406 → CHANGE REQUEST OR MAINTENANCE
- 408 → SERVICE STATUS
- 410 → CONFIGURATION CHANGES
- 412 → ACTIVE/PASSIVE PERFORMANCE METRICS
- 414 → CUSTOMER REAL-TIME DATA
- 416 → MAINTENANCE EVENTS
- 418 → TICKETING INFORMATION
- 420 → OVER-UTILIZATION ANALYSIS

FIG. 4

SYSTEM AND METHOD OF TROUBLESHOOTING IN A TELECOMMUNICATIONS NETWORK

CROSS-REFERENCE TO RELATED APPLICATIONS

This application is related to and claims priority under 35 U.S.C. § 119(e) from U.S. Patent Application No. 62/424,983, filed Nov. 21, 2016, titled "SYSTEM AND METHOD OF TROUBLESHOOTING IN A TELECOMMUNICATIONS NETWORK," the entire content of which is incorporated herein by reference for all purposes.

TECHNICAL FIELD

Aspects of the present disclosure generally relate to systems and methods for implementing a telecommunications network, and more specifically for troubleshooting issues in providing services to customers of a telecommunications network.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide Internet access to its customers, long distance communication capabilities, high definition audio and/or video communication capabilities, and the like. In other examples, the telecommunication network may be utilized by other networks to provide certain services to customers of the other networks. In this manner, a telecommunication network may provide any number of communication services to the various customers purchasing those services from the network.

For any number of reasons, services provided by the telecommunications network to a customer may be interrupted. The interruption may include a slowing at a rate of receiving packets up to and including a full ceasing of the service to the customer. For example, the customer may determine that information packets are not being received from the network at a presubscribed transmission rate. In another example, the customer may determine that information packets are missing or being dropped before reaching the customer's network devices. When a service interruption is detected, the customer often contacts a network administrator to report the service interruption and request the services be restored. The network administrator will often open a restoration "ticket" to begin a process of identifying a source of the interruption and restoring service to the customer. However, this process often includes several network engineers to determine the source of the interruption and field engineers to resolve the issue. Further, it is often difficult to isolate and determine the source of the interruption as the operational information of the network available to the network engineers and field technicians may be limited.

SUMMARY

One implementation of the present disclosure may take the form of a method for operating a telecommunications network. The method may include the operations of receiving, at a computing device, an indication of an interruption to a service provided by the telecommunications network, determining a service path to provide the service, the service path comprising at least one networking device, at least one connection, and at least one communication port, and collecting data from a plurality of databases by a data collector system, the data associated with at least one networking device of the service path. The method may further include creating a service path operational profile from the collected data and calculating a probable source of the service interruption by applying the service path operational profile to a probability index of a data analytics engine. Another implementation of the present disclosure may take the form of a non-transitory computer-readable medium that is encoded with instructions, executable by a processing device, for operating a component of a telecommunications network. When the instructions are executed, the processing device performs the operations described above.

Another implementation of the present disclosure may take the form of a system for troubleshooting a telecommunications network. The system may include a service path mapper, executed on a computing device, in communication with a telecommunications network, the service path mapper receiving an indication of an interruption to a service provided by the telecommunications network and mapping a service path to provide the service to a customer of the telecommunications network, the service path comprising at least one networking device, at least one connection, and at least one communication port. The system may also include a plurality of network databases in communication with a data collector, the data collector accessing the plurality of network databases to obtain data associated with at least one networking device of the service path and a correlation and disposition component of the computing device creating a service path operational profile from the collected data and calculating a probable source of the service interruption by applying the service path operational profile to a probability index of a data analytics engine.

BRIEF DESCRIPTION OF THE DRAWINGS

FIG. 4 is a list of types of network information stored in one or more network databases from which service information may be obtained.

DETAILED DESCRIPTION

Aspects of the present disclosure involve systems, methods, computer program products, and the like, for troubleshooting interruptions of service in a telecommunications network and providing potential remedies to restore the interrupted service to the customer. The system may include a customer portal through which an indication of the service interruption is provided. With the indication received, the system may utilize a service path mapping system to determine the network elements, components, connections, and/or ports included in providing the particular service to the particular customer. Once the service path is determined, a data collector may obtain data from several databases of the telecommunications network related to the components and connections of the service path. The collection of data may also include one or more queries to the components included in the service path to obtain operational statuses of the components and connections. Such data may include, in addition to active and passive performance metrics across the components and connections, maintenance procedures both completed and scheduled, open and known restoration tickets on the components, upcoming maintenance or service alterations, and the like. This wide range of obtain service path information may provide a better understanding of the current and upcoming operational state of the components of the service path to better diagnose the source of the service interruption.

Once collected, the data may then be correlated and provided to the requesting customer through the customer portal. The information may be utilized by the customer to diagnose or identify a source of the service interruption in the service path to begin to restore the interrupted service. In another embodiment, the information obtained about the components and connections in the service path may be correlated and provided to one or more data analytics systems. The data analytics system, through an analysis of the provided information, may output a probability of potential sources of the service interruption. In other words, the analytics system is a probability index built on varying conditions and states of network components included in service paths through the network. In one embodiment, the analytics system may include a machine-learning aspect that receives feedback on determined sources of service interruptions and adjusts the probability indices within the index based on the received feedback. In this manner, the gathered network component and connection information may be analyzed and a list of most likely sources of the service interruption is provided to a network administrator or the customer to the network. This information may then be utilized to restore the service to the customer with minimal or no involvement with network engineers or field technicians.

Figure 1:
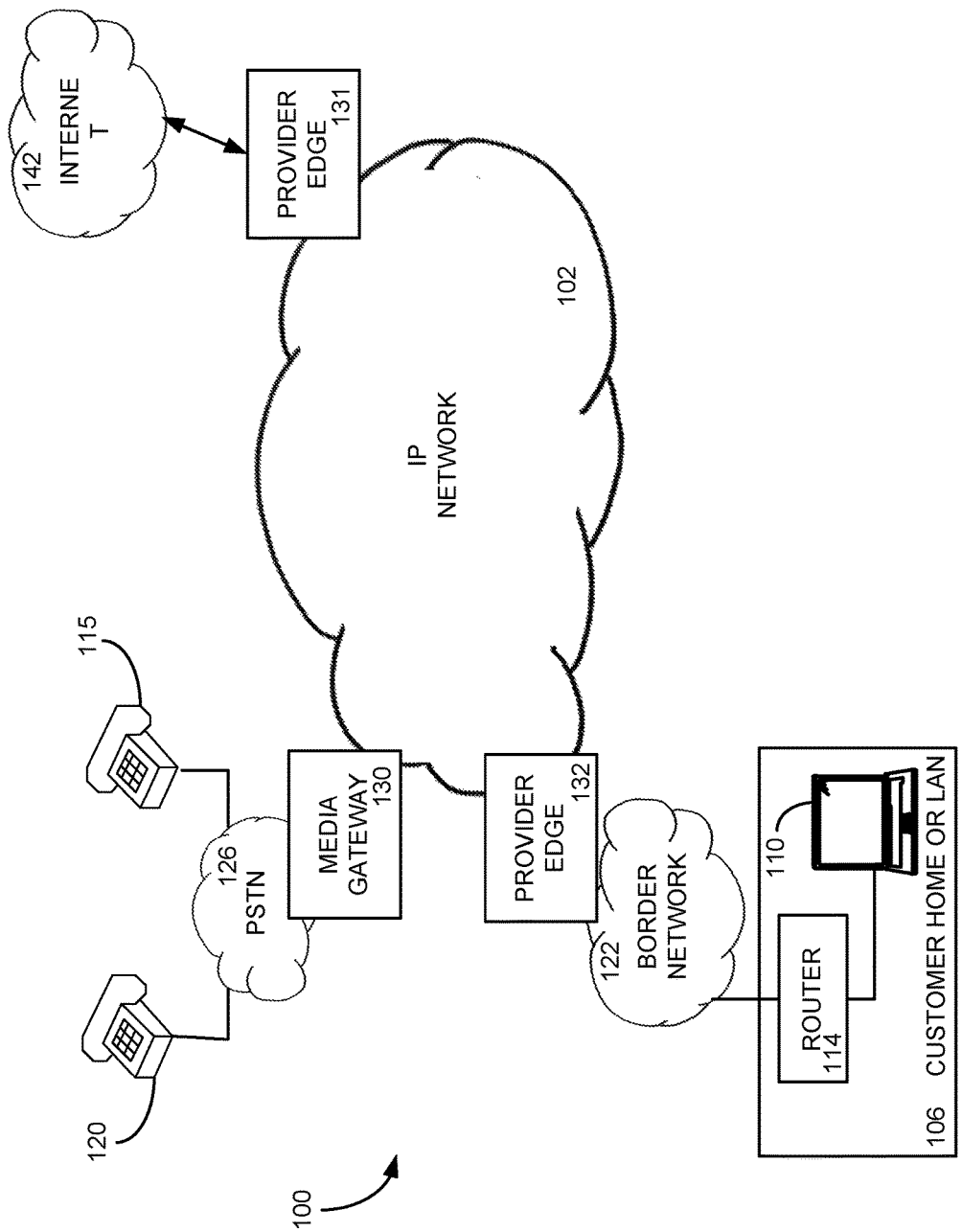
FIG. 1 schematic diagram illustrating an exemplary Internet Protocol (IP) operating environment in accordance with one embodiment.

Beginning in FIG. 1, an exemplary operating environment 100 that may utilize the system for data collection and analytics of a service interruption is described. In general, the environment 100 provides for establishing communication sessions between network users and for providing one or more network services to network users. For example, users to the network 100 may communicate with each other through communication devices, including voice communications and video communications. With specific reference to FIG. 1, the environment 100 includes an IP network 102, which may be provided by a wholesale network service provider. However, while the environment 100 of FIG. 1 shows a configuration using the IP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, and registrars, which enable communication and/or provides services across the IP network 102, but are not shown or described in detail here because those skilled in the art will readily understand these components. In some instances, those communications may be exchanged across the network 102 over long distances. More relevant to this description is the interaction and communication between the IP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the IP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 106 typically connects to the IP network 102 via a border network 122, such as one provided by an Internet Service Provider (ISP). The border network 122 is typically provided and maintained by a business or organization such as a local telephone company or cable company. The border network 122 may provide network/communication-related services to their customers. In addition, the communication device 120 accesses, and is accessed by, the IP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the IP Network 102 through a media gateway device 130 or provider edge 132, 131. For ease of instruction, only three communication devices 110, 115, 120 are shown communicating with the IP network 102; however, numerous such devices, and other devices, may be connected with the network, which is equipped to handle enormous numbers of simultaneous calls and/or other IP-based communications.

In many IP networks 102, communications through the network are routed based on a SIP URI. For example, a user to the network 102 may utilize a communications device (such as a telephone) to dial a telephone number (TN) for the destination communication device. The user's device or other component within the network environment 100 converts the TN into a SIP URI associated with the destination communication device. The SIP URI is then utilized by the network 102 to route the communication through the network to the destination device associated with the dialed TN. In other examples, communications may be routed through the network 102 based on an SS7 signaling protocol.

Figure 2:
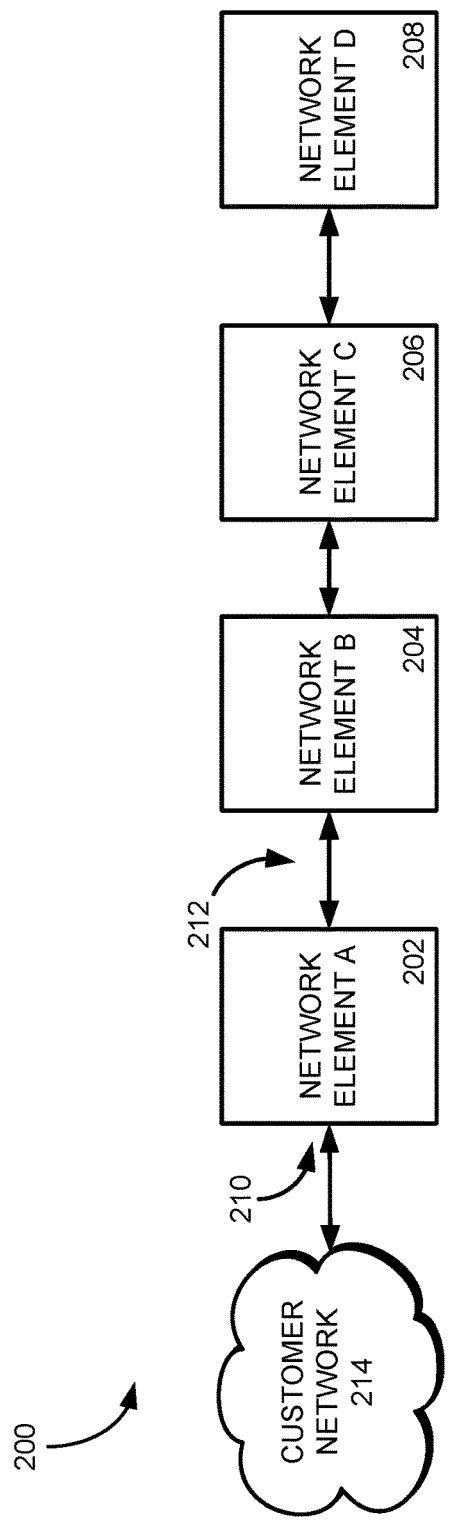
FIG. 2 is a schematic diagram illustrating an example path through a telecommunications network for providing a service to a particular customer to the network.

As mentioned above, the IP network 102 may provide services to one or more customers to the network. For example, the network may provide connectivity to the Internet, long distance communication availability, content delivery network connectivity, etc. In general, each service provided to a customer follows a particular service path through the network to provide the service. FIG. 2 is a schematic diagram illustrating an example path 200 through a telecommunications network 102 for providing a service to a particular customer to the network. The service path 200 is simply an example of a path through the network. Thus, it should be appreciated that more or fewer components, connections, and ports may be included in any service path through the network to provide a service to a customer of the network.

As shown in FIG. 2, the service path 200 may include a plurality of networking components 202-208, such as switches, routers, gateways, servers, etc. Such components may be a portion of the IP network 102 discussed above in relation to FIG. 1. In addition to the components, the path 200 may include connections 212 between the components 202-208 along which information packets that comprise the telecommunications service may be transmitted. Such connections 212 may include fiber optic cables, wired or wireless communications, and/or any other transmission media to transmit packets between the components. Each component 202-208 of the service path 200 may also include one or more communication ports 210 through which the data packets are transmitted and/or received at the components. Thus, a communication packet may be transmitted from an egress port on a first component 202, travel along the communication path 212, and be received at an ingress port of a second component 204. In this manner, communication packets of the service provided to a customer are transmitted between the components of the service path 200.

In the particular service path 200 illustrated in FIG. 2, a customer network 214 connects to a first networking device (network element A 202). In some embodiments, the customer network 214 may be any secondary network in communication with the IP network 102, such as a customer network, a customer LAN, a LEC, and the like. Network element A 202 may be any networking device that provides an interface to a customer's network, such as a gateway, a switch, a router, and the like. Information packets included in the service provided to the customer may be transmitted through one or more ports 210 of the network element 202, as is well-known in the art.

Network element A 202 may not be the device within the IP network 102 that provides the requested service to the customer network 214. Rather, some other device in the network 102 may be tasked with providing the service to the customer. However, the information packets that comprise the service to the customer may be passed through several networking devices between the customer network 214 and the service-providing device. For example, network element D 208 may provide the requested service to the customer network 214. However, to transmit the information packets of the service to the network 214, the packets may be transmitted from network element D 208 through network elements C-A 206-202 before reaching customer network 214. The service path 200 thus defines the network elements, ports, transmission media, etc. through the network that an information packet travels to provide the service to the customer. In another example, the customer network 214 may receive long distance service through the IP network 102. Thus, the service path 200 may include the components used to carry the information packet between the originating network and a terminating network. In any event, the service 200 defines the route through the network 102 for a particular client service.

Figure 3:
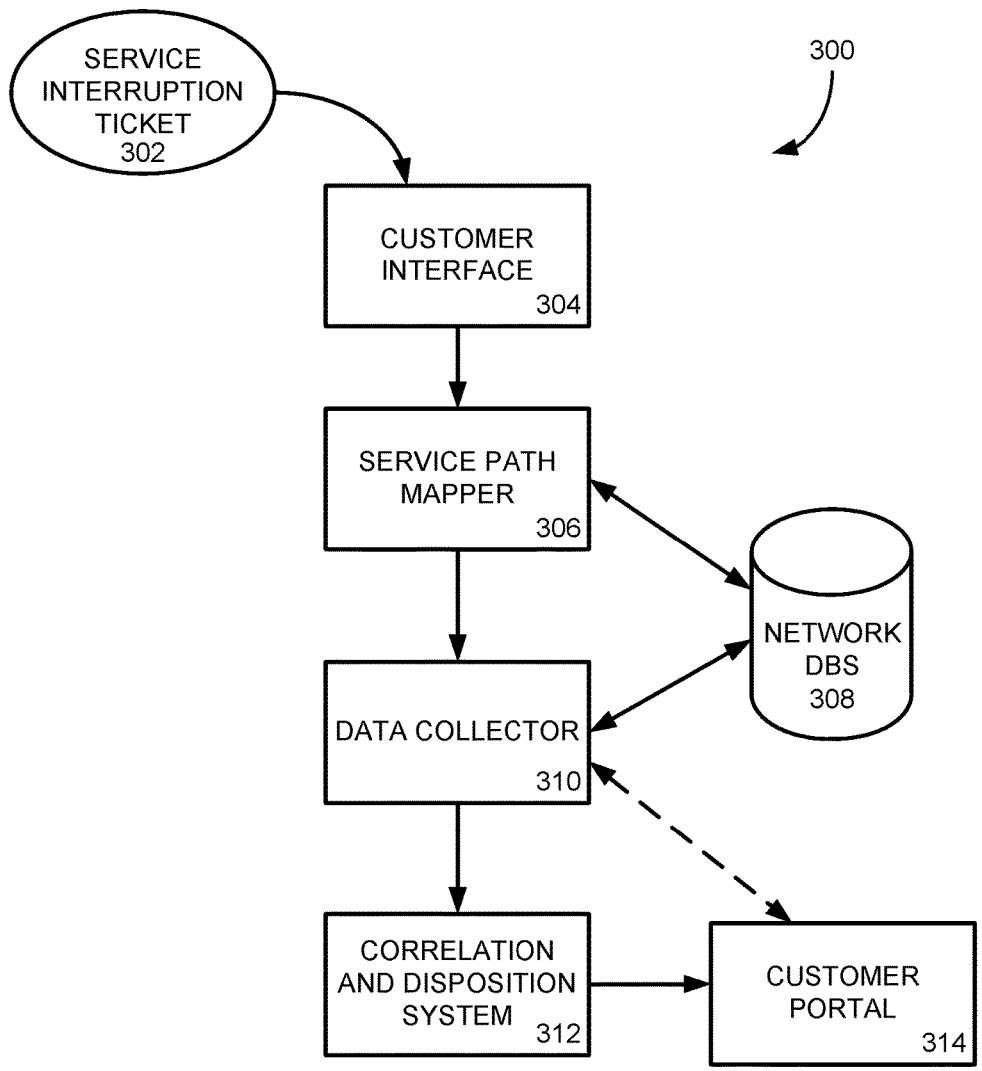
FIG. 3 is a schematic diagram illustrating a system for collecting data and providing a disposition related to a service interruption of a telecommunications network.

As mentioned above, interruptions to a service provided to a customer network 102 may occur within the network 102 for any number of reasons, including faulty connections between components, changes to operating states of components, operating faults within components, improper connection of components, and the like. However, detection and troubleshooting of such interruptions are often difficult to obtain in large telecommunication networks. To this end, provided in FIG. 3 is a schematic diagram illustrating a system 300 for collecting data and providing a suggested disposition related to a service interruption of a telecommunications network. The system 300 may be thus included or otherwise associated with a telecommunications network 102 for determining a source of a service interruption provided by the network. The components of the system 300 discussed may be embodied in one or more network components, included one or more application servers of the network. In other embodiments, the components may be included in other networks or other computer systems in communication with the telecommunications network. In general, any network component or related computing device may be utilized in the system 300 of FIG. 3.

Figure 5:
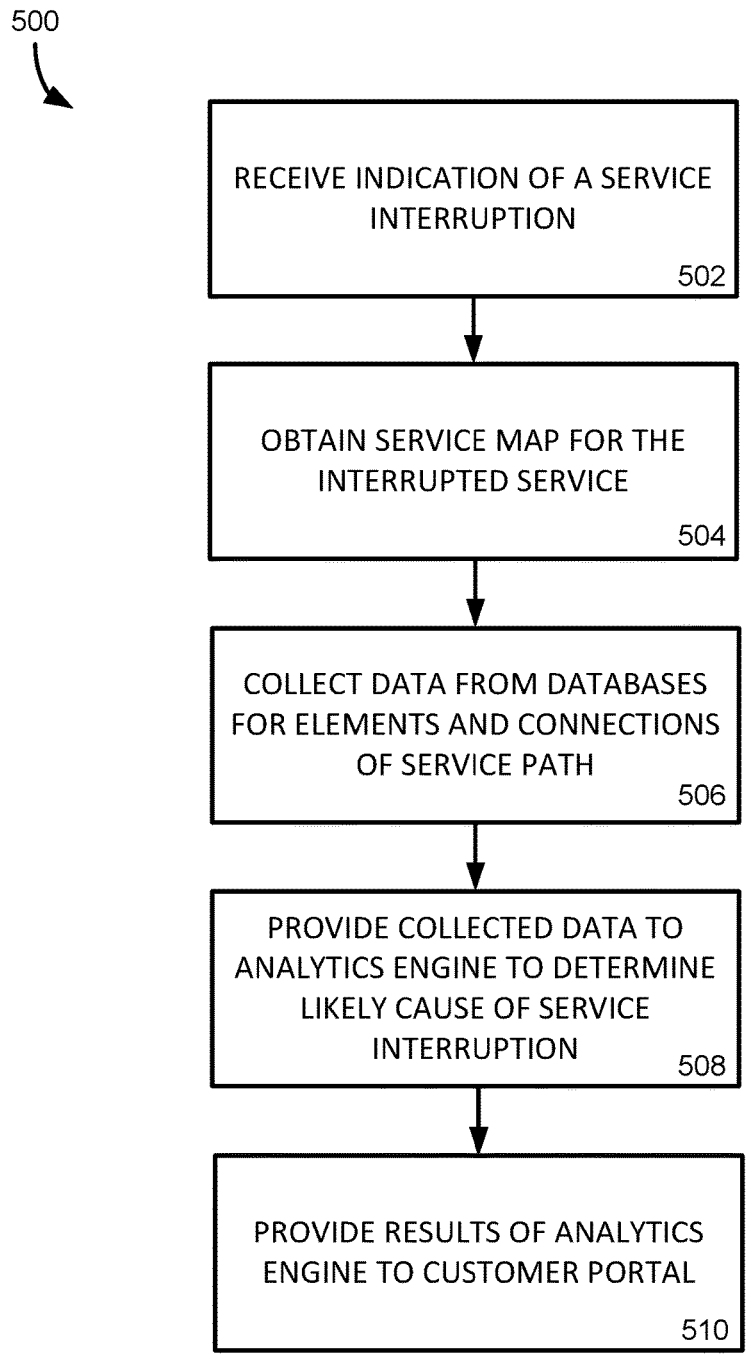
FIG. 5 is a flowchart of a method for a telecommunications network tool to obtain service path information and providing a potential source of a service interruption to a customer of the network.

The operations of the system 300 of FIG. 3 are described in the method 500 of the flowchart of FIG. 5. As such, the system 300 is described herein in reference to both FIG. 3 and FIG. 5. It should be appreciated, however, that more or fewer of the operations of the method 500 may be performed by the system 300. Further still, the operations may be performed by other components associated with the telecommunications network that are not shown in FIG. 3 or discussed herein. In general, the system 300 and method 500 provides a telecommunications network administrator a tool through which a service interruption may be diagnosed and, in some instances, a suggested remedy for the interruption may be determined and provided to the network administrator or a customer to the network.

Beginning in operation 502, the system receives an indication of an interruption of a service provided to a particular customer of the telecommunications network. In one embodiment, the indication of the service interruption is a service interruption ticket 302 provided to the system 300 from a customer experiencing the interruption. In other words, the customer may detect that an interruption in a provided service has occurred, such as a slowdown in receiving packets from the network or a complete shutdown of the service from the network. The customer may then contact the network administrator in some manner, such as through a customer portal or interface 304 or by calling the network administrator, to report the service interruption. The network administrator may then open a service interruption ticket 302 and provide said ticket to the system 300 for processing. In another embodiment, the network itself may detect a service interruption, perhaps through one or more service interruption alarms disposed along a service path 200 through the network.

Regardless of how the indication of the service interruption is received, the system 300 utilizes a service path mapper 306 to determine a service path through the network to provide to the service to the customer indicated in the service interruption ticket 302. In one embodiment, the service path mapper 306 may access one or more databases 308 of network information to create the service path for the interrupted service. In particular, the databases 308 may include provisioning information for the components of the network 102 that define which components are connected to each other, how those components are connected (such as port number, transmission media, and the like), and port ownership or provisioning information. With this information, the service path mapper 306 may construct a service path for the interrupted service, similar to the service path 200 illustrated in FIG. 2. As mentioned, the service path 200 may include the network components utilized to provide the service, the connections between the components, and/or port information of the path. Further, the service path 200 may include one or more endpoints of the path, such as customer networks 214 to which information packets are provided. In general, any component, path, port, or connection information utilized to provide the service to the particular customer is provided in the service path 200 from the service path mapper 306.

In one particular embodiment, a device identifier of an endpoint device 214 (corresponding to a starting or finishing node of the network service path) is used to interrogate the network to discover devices of a network service path to aid in determining the service path 200. Specifically, the device identifier is used to query a database or otherwise conduct a search for network elements that have interacted with the endpoint device to provision a customer service instance. The database aggregates network traffic data from dynamic network tables associated with candidate network elements of the network. The database is then used to determine which, if any, of the network elements have interacted with the endpoint device 214 and, as a result, potentially form a part of a network service path associated with the endpoint device. In particular, the database 308 is queried to determine whether the device identifier or attribute has been logged within any of the aggregated network traffic tables. Where the device identifier is logged within network traffic data associated with a certain network element, the network element may be identified as forming a part of the network service path.

In certain implementations, configuration data and predefined network architecture rules regarding location of network elements are also accessed to determine the particular order of the network elements 202-208 of the network service path 200. Specifically, each network element may have a particular type, function, or other characteristic which defines a predetermined order or position of the network element within a network service path 200. Architectural rules may then be used to determine the orientation of the elements within a network service path. For example, where a network element of the network service path 200 is identified as a particular type of router, certain predefined architectural rules may define the specific orientation of the router within the network service path.

To map service paths between endpoint devices, a service path mapper 306 may access a network traffic database (a portion of network databases 308). The network traffic database aggregates and stores network traffic data from each the network elements 202-208 and any other network elements that may be included in the network 102. For example, each of the network elements 202-208 includes or is otherwise in communication with a respective network table. During operation, the network elements 202-208 receive network traffic and generate and store records in the network tables corresponding to the connections through which the network traffic is received. The network tables of the network elements 202-208 generally include mappings of addresses to ports and also historical data regarding connections made via the network elements. When the network traffic is received and forwarded by one of the network elements 202-208, the network element generates a record in its corresponding network table. The record generally includes an identifier corresponding to the first endpoint device and may further include additional details regarding the network traffic including, but not limited to, an address of the origin device, a VLAN identifier associated with one or more of the first and second endpoint devices, a device type associated with one or more of the first and second endpoint devices, and other attributes of either of the first and second endpoint devices.

The service path mapper 306 is configured to periodically retrieve and store data from the network tables in the network traffic database 308 and determine network service paths based on the network traffic data stored in the network traffic database. During execution of a network service path mapping application, the network service path mapper 306 executes a first query based on an identifier associated with the first endpoint device to determine a first set of network elements of the IP network 102 through which data originating from the first endpoint device has passed. The network service path mapper 306 may then determine a second set of network elements of the IP network 102 through which data originating from the second endpoint device has passed and an intersection of the first set and the second set, thereby identifying network elements through which data has or is capable of being transmitted between the first and second endpoint devices.

In certain implementations, the service path mapper 306 determines the arrangement of network elements between the first and second endpoints by one or more of analyzing data associated with each identified network element, applying business and network architecture rules based on characteristics of the identified network elements, and the like. Accordingly, the service path mapper 306 may include or otherwise have access to a secondary data source containing data for establishing the order of network devices along a network service path 200. The service path mapper 306 may be configured to retrieve the rules or configuration data from the secondary data source and determine the order or relationship between network devices based on the retrieved rules and configuration data.

With the information of the service path 200 obtained, the system 300 may utilize a data collector component 310 in operation 506 to obtain data of the components, connections, ports, etc. within the service path 200. In one particular embodiment, the data collector 310 accesses one or more databases 308 associated with the telecommunications network to obtain information about the components and connections of the service path 200. The databases 308 may be any number of databases and may be maintained by an administrator of the network or by a third party. Further, as explained in more detail below, the information obtained from the databases 308 may be more than merely performance metric information of the network. Rather, additional network information, such as executed or scheduled maintenance on components, other service tickets received or in process, and operational status of the components may also be obtained and considered. In general, however, any information about the components or connections of the service path 200 may be obtained from the databases 308 by the data collector 310 for use by the troubleshooting system 200.

As mentioned, any number of databases and network information may be obtained by the data collector 310 based on the provided service path 200. FIG. 4 is diagram of a list of types of network information stored in one or more network databases from which service information may be obtained. The list of types of information obtained from different databases 308 is not exhaustive and more or fewer databases and types of information may be collected by the data collector 310.

As shown in the list 400, any number of various sources of information and types of information of the network devices may be obtained. In general, the listed information may be obtained from a single database designated for the type of information listed, or may be obtained from a plurality of databases storing the listed information. In one example, the data collector 310 may obtain "as-ordered" information 402 that provides information specific to a received order for the service that is suffering interruption. This received order information may provide service path information, such as the type of service provided, the components used to provide the service, and a transmission rate at which the service is requested. Any other special requests associated with the service from the customer may also be included in the as ordered information 402. Another database/information set include current or recently triggered alarms 404 of the components of the service path 200. This alarm information may provide an indication of a recent or current issue with one or more components of the service path 200. Yet another database/information set includes received change requests or maintenance 406 on the components of the service path 200. This information set provides any received changes to the operating status or maintenance of the components of the service path 200 that could affect the performance of the component. Change requests may be provided to the database 406 by a network administrator in response to an unrelated service request from another customer to the network. Similarly, maintenance information may be generated and stored in the database 406 by a network administrator in relation to a routine or necessary maintenance to ensure the component in the service path 200 is operating properly.

In another database or information set, a service status 408 of a component or port of the service path 200 may be collected by the data collector 310. The service status 408 provides an operational state for the component or port of the service path 200, such as whether the port is disconnected, live, on hold, scheduled for provisioning, etc. Configuration information 410 may also be obtained that indicates changes made to configurations of a component or port. For example, a port may be provisioned to carry T1-type traffic, but could be reconfigured to carry T3-type traffic. The scheduled or recent changes to the configurations 410 of the port or components of the service path 200 may then be collected by the data collector 310. In another example, active and/or passive performance metrics 412 for the service path 200 may be collected by the data collector 310. These performance metrics 412 provide an indication of the connectivity and reliability of packet transmission between components of the service path 200. When a slowdown in traffic flow or a drop of traffic data is detected at a component, an alarm may be generated and stored in the database 412 that describes issues in performance of the component connection.

Other information and database may also be collected. For example, real-time data 414 of a customer's network 214 may be obtained. Real-time performance data 414 is obtained by the network for the database by polling a customer network's interface to the network to determine incoming and outgoing packets. This information 414 may provide an indication if a source of the service interruption exists in a customer's network along the service path 200. Scheduled or completed maintenance events 416 may also be obtained by the data collector 310. Maintenance event information 416 may include an identification of the component under maintenance, the type of maintenance, and a reason for the maintenance. Similarly, service ticketing information 418 may also be obtained. This information 418 provides information on open or recently closed service tickets on the components of the service path 200. For example, a source of the service interruption may already be determined and a ticket to resolve the interruption may already exist. Such information would then be available through this database 418. Yet another database or set of information includes analysis information on over-utilization of a communication path 420 through the network. In particular, the network may be configured to monitor the performance of packets through the network and provide such information to a database 420. When slowdowns occur on one or more connection paths, the network may become aware of the overutilization of the network connection and provide such information to the associated database 420.

As mentioned, the data collector 310 may collect one or more of the above listed information to aid the system 300 in determining a source of a particular service interruption. Thus, the information obtained from the databases 308 by the data collector 310 may be provided to a correlation and disposition system 312 in operation 508. In general, the correlation and disposition system 312 analyzes the collected information about the service path 200 and provides a probability on a source or cause of the service interruption. As such, the correlation and disposition system 312 may include a series of software instructions, hardware circuits, or combination of software and hardware to perform the operations described below to provide probabilities on a source or cause of the service interruption in response to the service path information provided to the system.

In particular, the information obtained by the data collector 310 is provided to the correlation and disposition system 312. The disposition system correlates the information to create a service path operating profile of the service path 200. The service path operating profile, in general terms, describes the operational state and intended changes of the service path that provides the interrupted service to the customer. For example, the service path operating profile may include an indication of each component, connection, port, etc. of the service path, a current operating and/or provisioning status of the components, connections, and ports, and/or any planned or scheduled maintenance, upgrades, changes, etc. for the components of the service path. In this manner, the service path operating profile provides a snapshot of the current operating state of the service path and any potential or recent changes made to the path. The format of the service path operating profile may be any format that allows the disposition system 312 to further process the information.

Further, in some embodiments, the disposition system 312 may input the service path operating profile into a data analytics system to obtain a probability of a source or cause of a detected service interruption. The data analytics system includes a probability index with service path operating information as the input to the probability index. For example, the probability index may, for a particular given set of operational information of a service path, provide a probability or suggested source of the service interruption. For a different set of operational information of the service path, a different suggested source of the service interruption is returned. The probability index of the data analytics system 312 may accept any number of service path operational data sets to determine a most likely source of the service interruption. In this manner, the probability index uses the input of the service path operational profile to determine a probability or most likely source or cause of a service interruption. For example, the service path operational profile may indicate that no alarms or issues are detected on the service path through the network 102. In this example, the data analytics may determine that the issue is most likely within the customer network and return such an indication. If the service path operational profile includes an alarm or detected traffic flow issue on a particular component or connection in the service path, that profile would then indicate (after being analyzed through the data analytics system) that the likely source of the service interruption is the particular component or connection. In general, any number of data sets may be utilized to obtain a source probability such that the probability index of the data analytics system may be of any size.

In some embodiments, the disposition system 312 may return several potential sources of the service interruption, with each possible source associated with a probability or likelihood of that source being the cause of the service interruption. For example, the disposition system 312 may include three potential sources of the service interruption listed from the most likely source to the least likely source. In general, any number of possible sources may be provided by the disposition system 312 based on the service path operational profile. In some embodiments, a calculated probability of each potential source may also be provided.

Further, in still other embodiments, the correlation and disposition system 312 may include a machine-learning aspect to improve and adjust the probability matrix and data analytics. For example, the system 312 may provide a probable source for the service interruption for a given service path operational profile as described above. The accuracy of the provided probable source may then be determined based on feedback from a network engineer as to the actual cause of the service interruption. If the likely source was accurate, the probability of the source of the issue based on the same or similar service path operational information may be increased. Alternatively, if the provided source of interruption was not accurate, the probability matrix of the data analytics may be adjusted lower to decrease the probability for that set or a similar service path operational profile. In this manner, the data analytics system 312 may learn or otherwise be adjusted from a feedback on the accuracy of a provided probability of a source of a service interruption. In general, the machine-learning techniques of the disposition system 312 may take on any known or hereafter developed machine-learning techniques to improve the accuracy of the data analytics of a provided service path operational profile.

Returning to FIG. 5, the correlation and disposition system 312 may provide the results of the data analytics to a customer portal 314 in operation 510. In one embodiment, the customer portal 314 is an interface through which the customer to the network accesses information concerning the network. The source probabilities may thusly be provided to the customer for recommendations on resolving the service interruption. In another embodiment, the customer portal 314 may include an interface through which a network administrator may access the network information. In this manner, a network engineer or field technician of the telecommunications network may receive the output from the disposition system 312 and begin to remedy the service interruption by performing one or more remedial actions on a component, connection, or port of the service path 200. In yet another example, the data collected by the data collector 310 of the system 300 may be provided directly to the customer portal 314 without being processed through the disposition system 312. In this example, the customer or network administrator may diagnose a likely source of the service interruption from the provided data and begin to remedy the interruption as described.

Through the systems and methods described herein, a service interruption of a telecommunications network 102 may be detected and a potential source of the interruption may be identified. This troubleshooting of the service interruption may occur automatically upon the receiving of an indication of the service interruption without the need for a network engineer to analyze and diagnose the interruption. The troubleshooting of the service interruption may include creating a service path through the network, collecting operational or other data about components of the service path, and determining and providing a probability of a source of the service interruption within the service path to a network administrator or customer. This probable source of the service interruption may then be utilized to remedy the service interruption.

Figure 6:
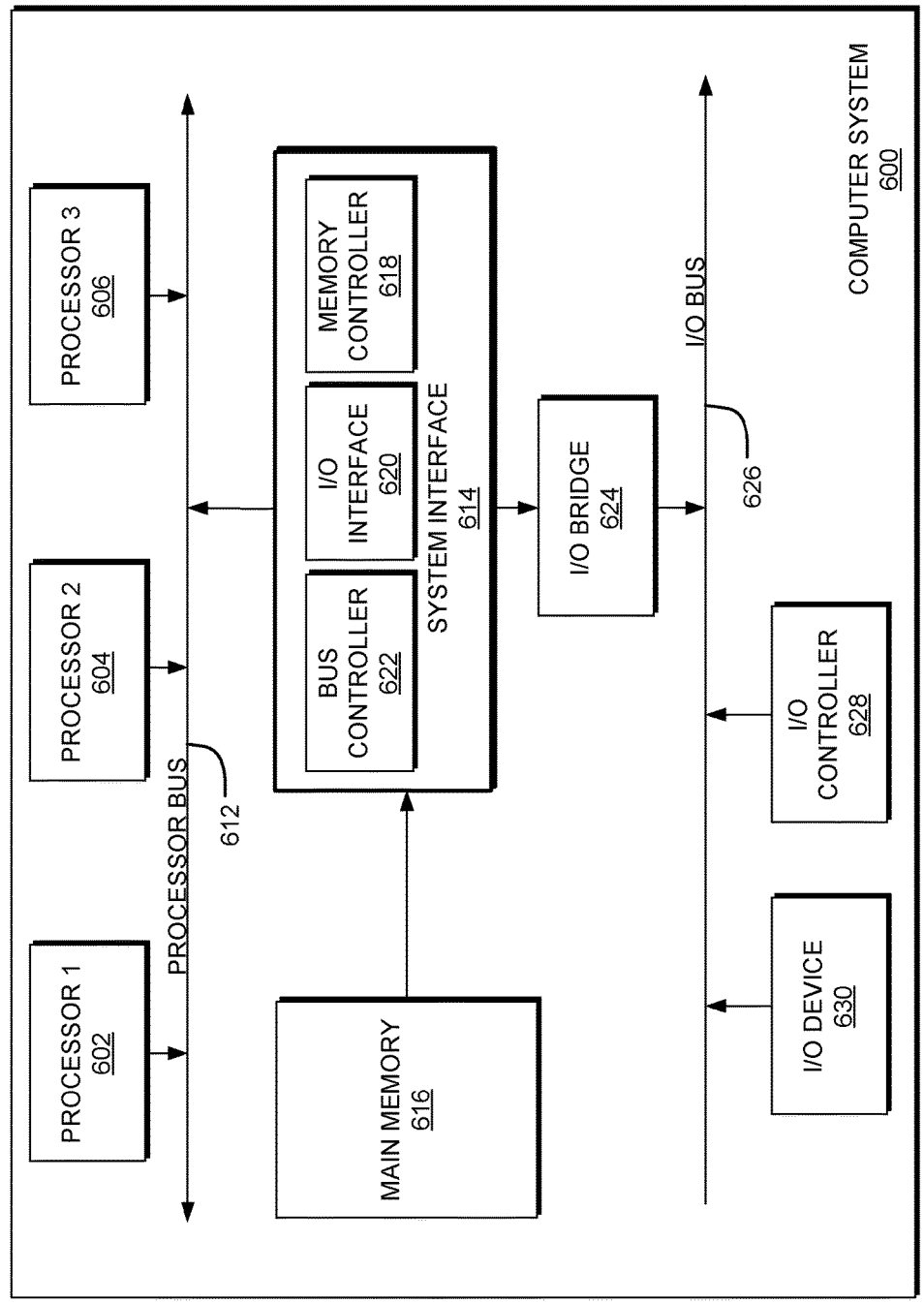
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be a computing device to manage the IP endpoint database 202 discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 640, as illustrated.

I/O device 640 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for operating a telecommunications network comprising:
   receiving, at a computing device, an indication of an interruption to a service provided by the telecommunications network;
   determining a service path to provide the service, the service path comprising at least one networking device, at least one connection, and at least one communication port;
   collecting data from a plurality of databases by a data collector system, the data associated with the at least one networking device of the service path and comprising service order information, current alarm states, scheduled maintenance, and performance metrics of the at least one networking device of the service path;
   creating a service path operational profile from the collected data; and
   calculating a probable source of the service interruption by applying the service path operational profile to a probability index of a data analytics engine.

2. The method of claim 1 further comprising:
   accessing a provisioning database to obtain provisioning information of the at least one networking device, the at least one connection, and the at least one communication port.

3. The method of claim 1 wherein the service path operational profile comprises at least one of an indication of each component and port of the service path, a current operating state of each component of the service path, a current provisioning state of each port of the service path, or any scheduled maintenance of each component of the service path.

4. The method of claim 1 wherein the probable source of the service interruption comprises the probable source of the service interruption and a probability indicator corresponding to a calculated likelihood of the probable source as an actual source of the service interruption.

5. The method of claim 4 wherein the probable source of the service interruption comprises a plurality of potential sources of the service interruption and a plurality of probability indicators, each of the plurality of probability indicators correspond to a calculated likelihood of a particular one of the potential sources of the service interruption as the actual source of the service interruption.

6. The method of claim 1 further comprising:
   displaying on a display device the probable source of the service interruption, the display device accessible through a computing device in communication with the display device.

7. The method of claim 1 wherein the indication of the interruption to the service is received from a component of the telecommunications network based on an alarm state at the component.

8. A system for troubleshooting a telecommunications network, the system comprising:
   a service path mapper, executed on a computing device, in communication with a telecommunications network, the service path mapper receiving an indication of an interruption to a service provided by the telecommunications network and mapping a service path to provide the service to a customer of the telecommunications network, the service path comprising at least one networking device, at least one connection, and at least one communication port;
   a plurality of network databases in communication with a data collector, the data collector accessing the plurality of network databases to obtain data associated with the at least one networking device of the service path, the data comprising service order information, current alarm states, scheduled maintenance, and performance metrics of the at least one networking device of the service path; and
   a correlation and disposition component of the computing device creating a service path operational profile from the collected data and calculating a probable source of the service interruption by applying the service path operational profile to a probability index of a data analytics engine.

9. The system of claim 8 further comprising:
   a provisioning database comprising provisioning information of the telecommunications network, wherein the service path mapper accesses the provisioning database to obtain provisioning information of the at least one networking device, the at least one connection, and the at least one communication port.

10. The system of claim 8 wherein the service path operational profile comprises at least one of an indication of each component and port of the service path, a current operating state of each component of the service path, a current provisioning state of each port of the service path, or any scheduled maintenance of each component of the service path.

11. The system of claim 8 wherein the probable source of the service interruption comprises the probable source of the service interruption and a probability indicator corresponding to a calculated likelihood of the probable source as an actual source of the service interruption.

12. The system of claim 11 wherein the probable source of the service interruption comprises a plurality of potential sources of the service interruption and a plurality of probability indicators, each of the plurality of probability indicators correspond to a calculated likelihood of a particular one of the potential sources of the service interruption as the actual source of the service interruption.

13. The system of claim 8 further comprising:
a display device in communication with and accessible through the computing device displaying the probable source of the service interruption.

14. The system of claim 8 wherein the indication of the interruption to the service is received from a component of the telecommunications network based on an alarm state at the component.

15. A non-transitory computer-readable medium encoded with instructions, executable by a processing device, for operating a component of a telecommunications network, the instructions, when executed by a processing device, cause the processing device to perform the operations of:

receiving, at a computing device, an indication of an interruption to a service provided by the telecommunications network;
determining a service path to provide the service, the service path comprising at least one networking device, at least one connection, and at least one communication port;
collecting data from a plurality of databases by a data collector system, the data associated with the at least one networking device of the service path and comprising service order information, current alarm states, scheduled maintenance, and performance metrics of the at least one networking device of the service path;
creating a service path operational profile from the collected data; and
calculating a probable source of the service interruption by applying the service path operational profile to a probability index of a data analytics engine.

16. The non-transitory computer-readable medium of claim 15 wherein the instructions further cause the processing device to perform the operation of:
accessing a provisioning database to obtain provisioning information of the at least one networking device, the at least one connection, and the at least one communication port.

17. The non-transitory computer-readable medium of claim 15 wherein the service path operational profile comprises at least one of an indication of each component and port of the service path, a current operating state of each component of the service path, a current provisioning state of each port of the service path, or any scheduled maintenance of each component of the service path.

* * * * *